United States Patent
Benkert et al.

[11] Patent Number: 5,899,131
[45] Date of Patent: May 4, 1999

[54] APPARATUS AND METHOD FOR PROVIDING POCKETS IN A ROLLER CAGE OF A BEARING ASSEMBLY AND A ROLLER CAGE PRODUCED BY SUCH AN APPARATUS AND METHOD

[75] Inventors: Peter Benkert, Schonungen; Berthold Beyfuss, Kaisten; Peter Horling, Mainberg, all of Germany

[73] Assignee: SKF GmbH, Schweinfurt, Germany

[21] Appl. No.: 08/884,390

[22] Filed: Jun. 27, 1997

[30] Foreign Application Priority Data

Jun. 28, 1996 [DE] Germany .................... 196 25 931

[51] Int. Cl.⁶ .................................................. B26F 1/44
[52] U.S. Cl. .......................... 83/188; 83/49; 83/267; 83/691; 83/191
[58] Field of Search .................. 83/181, 182, 186, 83/188, 191, 687, 691, 49, 267

[56] References Cited

U.S. PATENT DOCUMENTS

| | | | |
|---|---|---|---|
| 3,261,248 | 7/1966 | Jespersen | 83/191 X |
| 3,289,511 | 12/1966 | Lansky | 83/191 |
| 3,535,964 | 10/1970 | Ahlman | 83/697 |
| 4,205,545 | 6/1980 | Andrews | 72/326 |
| 4,584,749 | 4/1986 | Horling et al. | 29/148.4 |
| 4,621,553 | 11/1986 | Gruchalski et al. | 83/194 |
| 4,633,744 | 1/1987 | Maurer | 83/128 |
| 4,802,393 | 2/1989 | Gruchalski et al. | 83/184 |

*Primary Examiner*—Douglas D. Watts
*Assistant Examiner*—T. Anthony Vaughn
*Attorney, Agent, or Firm*—Burns, Doane, Swecker & Mathis, L.L.P.

[57] ABSTRACT

An apparatus for punching out pockets in a roller cage for rollers is provided with two simultaneously movable male dies whose outer cutting edges in the circumferential direction are spaced apart from one another by at least about 0.4 times the cage diameter. These male dies are preferably operative from the interior of the cage and each punches slightly more than half the pocket width. By indexing the cage by one pocket division each time, the pockets are punched out completely. In each punching increment, they receive the runup face for the roller over their entire length, which runup face need not be further machined. The method involves punching out a portion of the roller cage forming a first pocket through use of one of the dies, indexing the roller cage so that the just punched portion of the roller cage is advanced to a position between the two male dies, punching out a portion of a second pocket with the same die, and then indexing the roller cage to a position where the other die is able to punch out the remaining portion of the first pocket.

5 Claims, 1 Drawing Sheet

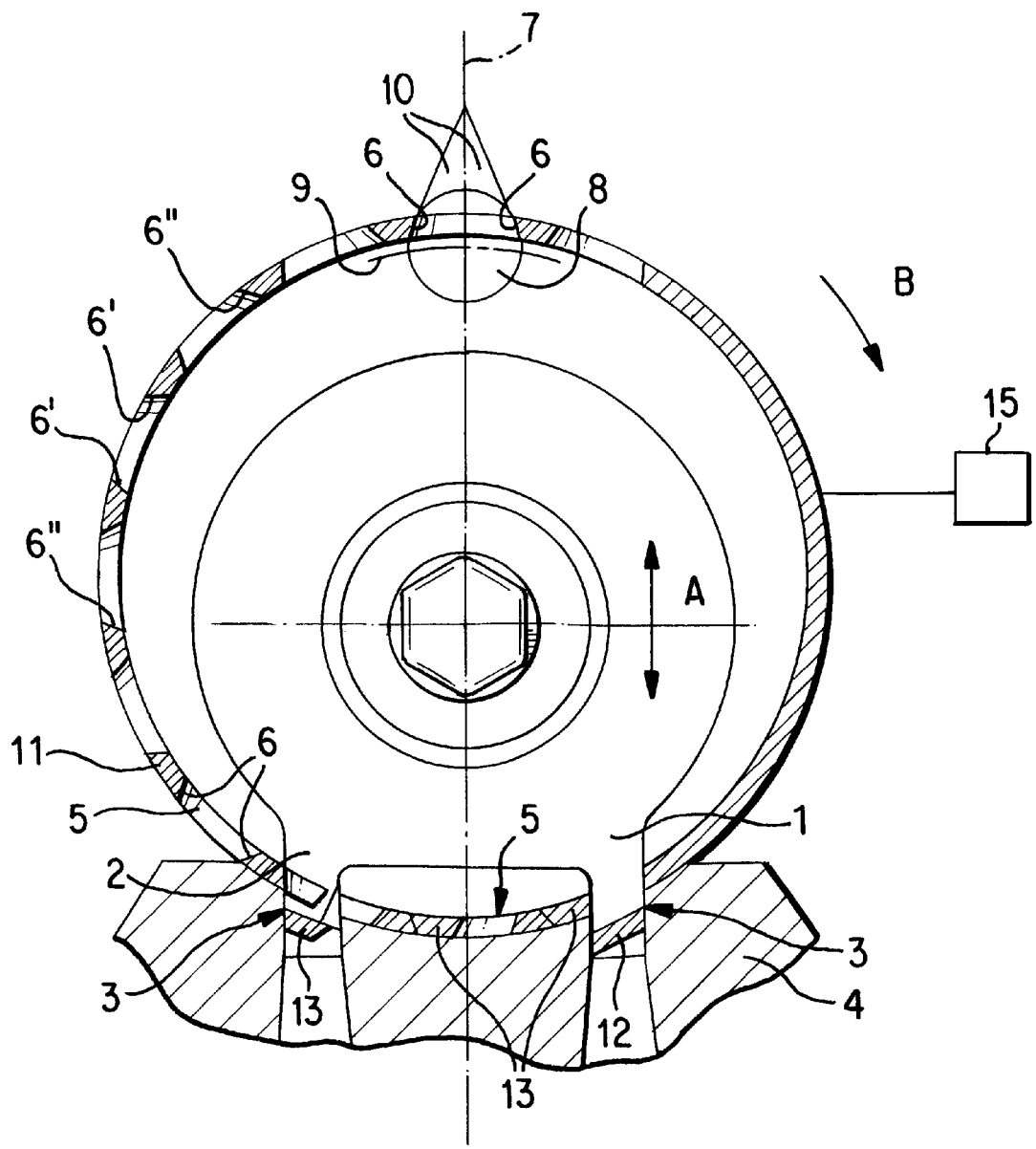

APPARATUS AND METHOD FOR PROVIDING POCKETS IN A ROLLER CAGE OF A BEARING ASSEMBLY AND A ROLLER CAGE PRODUCED BY SUCH AN APPARATUS AND METHOD

FIELD OF THE INVENTION

The present invention generally relates to bearing assemblies, and apparatus and methods used to manufacture parts of such assemblies. More particularly, the present invention pertains to an apparatus and method for punching out the pockets of a roller cage used in a bearing assembly, and a roller cage produced by such an apparatus and method.

BACKGROUND OF THE INVENTION

U.S. Pat. No. 3,535,964 discloses a tool used to produce pockets in a roller cage. The tool includes a U-shaped profile tool having parallel legs that are designed as male dies for punching. The pockets in the roller cage that are immediately adjacent one another and separated by a web are punched out in their full length and full width. In the punching operation, the outer cutting edges of the male dies pointing in the circumferential direction leave behind a peripheral portion that initially defines the pocket, while the inner cutting edges of the dies perform the final cutting of the runup face for the rollers.

Once the cage has been indexed onward in a one pitch increment, at the same side face of the web where the outer cutting edge of the male die was already operative, as described above, the inner cutting edge of the dies comes into use to remove an extremely narrow edge of the web side face to thereby form this web side face identically to the second one of this pocket. Because of the slight width of material that is removed, which tapers even further toward the wall thickness, major smearing of the cage material on the web side face occurs. This is undesirable as this side face of the cage is supposed to be precisely guided on the roller. Another disadvantage associated with this known tool is that the smearing also cause seizing of the male dies upon their removal from the pocket, as a result of which the webs can become deformed. A further disadvantage of the known tool is that particularly in cages of relatively large diameter, it is not possible to have an adequate inclined position of the guide faces to achieve radial holding of the roller. This is particularly true of needle cages provided with rather narrow webs.

Another drawback is that in the intended punching direction from the outside inward, because of the curvature of the cage, massive obtuse punching burrs protrude and can be removed only with great effort.

In addition to the foregoing problem, the known tool also has a graduation over the length of the pocket, in order to form retaining protrusions on the edges near the side ring that act in the opposite radial direction.

In light of the foregoing, a need exists for an apparatus and method for punching pockets in a roller cage and a correspondingly produced roller cage, in which the web side faces can be made without post machining.

A need also exists for an apparatus and method that can punch pockets in a roller cage and a correspondingly produced roller cage, in which the web side faces are dimensionally precise and have a substantially perfect sliding face surface.

It would also be desirable to produce an apparatus and method that can punch pockets in a roller cage and a correspondingly produced roller cage, in which the punching and formation work can be done without seizing of the male dies.

A need also exists for an apparatus and method that can punch pockets in a roller cage, and a correspondingly produced roller cage, in which sufficiently inclined web side faces for the sake of retaining functions are attainable.

SUMMARY OF THE INVENTION

To address the foregoing needs, the present invention provides an apparatus for punching pockets in a roller cage, wherein the spacing of the outer edges of the pair of male dies, disposed on the outside in the circumferential direction of the cage and cutting the web-sided runup faces, is equivalent to at least about 0.4 times the largest cage diameter. In addition, the active punching width of each male die in the circumferential direction of the cage is less than the width of the pockets.

According to another aspect of the invention, a method for producing pockets in a roller cage forming a part of a roller assembly involves moving relative to a cage roller a tool having first and second spaced apart dies so that the first die punches a portion of a first pocket in the roller cage, indexing the roller cage to move the portion of the first pocket produced by the first die to a position between the first and second dies, moving the tool relative to the cage roller so that the first die punches a portion of a second pocket in the cage roller, indexing the roller cage to move the portion of the first pocket to a position adjacent the second die and to move the portion of the second pocket to a position between the first and second dies, and moving the tool relative to the cage roller so that the second die punches a remaining portion of the first pocket to produce a complete pocket in the roller cage.

A roller cage produced in accordance with the present invention possesses a plurality of outer pockets in which the circumferentially outer, essentially axially extending runup faces of the circumferentially outer pockets of a group of at least three adjacent pockets are parallel.

The present invention is advantageous from the standpoint that the spacing of the two male dies is adapted relative to the cage diameter. With the arrangement according to the present invention, one or more pockets that are not machined in a particular indexing position are always located between the male dies. The circumferentially outer cutting edges thus need a relatively greatly inclined surface of the cage and at this point they punch out a runup face that is already adapted to the roller and extends obliquely and at a tangent to the jacket face of the roller. As a result, the roller cage is located farther away from the roller axis on the jacket face thereof and is therefore more easily guided and has less tendency to seize on the roller. Because of the greater incline, the runup face is moreover broader and can receive more lubricant. The runup face produced in this way requires no further punching or cutting operations. In the arrangement according to the present invention, somewhat more than half the pocket width in the circumferential direction is punched out. This is especially important for the ensuing supplementary punching out of the remaining pocket material with the other male die after suitable indexing. Because approximately one-half the pocket width is left in place, comparable conditions occur to those in existence when the first half is punched. In other words, the web is not liable to drift in the circumferential direction by the forces of punching. Rather, the cage is automatically held in position because of the large punching area. Moreover, the punching male die is not seized in the pocket by resilient material. The result is greater dimensional accuracy of the pocket and a high surface quality of the runup surfaces.

BRIEF DESCRIPTION OF THE DRAWING FIGURE

The foregoing and other features associated with the present invention will become more readily apparent from the following detailed description considered with reference to the accompanying drawing FIGURE which is a fragmentary cross-sectional view of an apparatus for punching out pockets for a roller cage, and a roller cage produced using such an apparatus.

DETAILED DESCRIPTION OF THE INVENTION

The apparatus according to the present invention for punching out pockets in a roller cage that is used in a bearing assembly is illustrated in the drawing FIGURE. The apparatus includes a vertically movable tool possessing two spaced apart male dies 1, 2 that are parallel or substantially parallel to one another. The two dies 1, 2 are connected to one another so they move simultaneously with one another during the punching operation. Each of the male dies has an outer cutting edge 3 that is located outside circumferentially. The spacing between the outer cutting edges 3, 3 of the two male dies 1, 2 is equivalent to at least about 0.4 times the roller cage diameter, such spacing preferably being approximately 0.6 times the cage diameter.

During operation, the tool executes a reciprocating motion in the direction indicated by the arrow A by virtue of being driven by a driving unit that is not specifically shown in the drawing FIGURE and that is disposed inside the cage. During the punching operation, the roller cage rests on a female die 4 that is adapted to the male dies 1, 2. The two male dies 1, 2 are spaced apart a distance greater than the distance between two adjacent pockets 5 so that any given punching operation produces two pockets which, in the finished cage, are separated by at least one other pocket not produced during that same punching operation. Thus, as shown in the drawing FIGURE, located between the two male dies 1, 2 is a pocket 5 that, in the illustrated punching step, has not yet been finished.

The punching operation produces pockets 5 having runup faces 6. Because of the significant spacing between the two male dies 1, 2, the result with reference to any one pocket 5 is runup faces 6 for the respective roller 8 that are greatly inclined relative to one another. Thus, as illustrated in the drawing FIGURE, the runup faces 6', 6' forming each pocket 5 are inclined relative to one another. As shown in the drawing FIGURE, the apparatus is designed so that each punching step results in only slightly more than half of one pocket 5 being punched out. Quite advantageously, the punching steps produce the runup faces 6 over the full length of the pocket 5, which runup faces 6 do not require further machining. Because of the significant inclination of the runup faces 6 relative to the radial line 7 of the roller cage, the runup faces 6 are considerably wider and rest on a roller 8 far outside the pitch circle 9 of the roller.

In addition, the fact that the punching is performed from inside the cage roller, in combination with the greatly inclined runup faces 6, means that the unavoidable punching burr forms on an angle 10 of the web 11 that comes to a very narrow point and is therefore very slender and can be removed easily, for instance by drum grinding.

An indexing device 15, which is schematically shown in the drawing FIGURE, rotates the cage by one pocket division in the direction of the arrow B between successive punching steps. During a punching step, a bit more than the right-hand half 12 of the pocket width is first punched out through use of the male die 1 shown on the right in the drawing FIGURE. The right-hand side of the runup face 6 of the pocket 5 is thus finished. When the cage device is then indexed one pocket division by the indexing device, the pocket 5 previously machined is moved into the middle position between the two male dies 1, 2. At this point, the left-hand, approximately one-half pocket width 13 has not yet been punched out. After the roller cage is indexed further to the next pocket division position, the male die 2 depicted as the left die in the drawing FIGURE comes into use with respect to the pocket which two indexing positions earlier was subjected to the punching operation for removing the right side portion of the pocket. The left side male die 2 then punches out the remaining left half 13 of the pocket width. The left runup face 6 is thus punched and the pocket 5 is finished.

As can be clearly seen, each male die 1, 2 always has a relatively wide piece of material to machine, namely approximately one-half the pocket width 12, 13. As a result, transverse forces in the circumferential direction of the roller cage toward the web 11 do not arise and hence this web cannot be positively displaced laterally. By virtue of the present invention, parallel-extending runup faces 6 of a group of three adjacent pockets 5 are produced at the outer cutting edges 3 of the two male dies 1, 2. Thus, the circumferentially outer, essentially axially extending runup faces 6 of the circumferentially outer pockets of a group of at least three adjacent pockets are parallel or substantially parallel. This is illustrated in the drawing FIGURE in which the outermost runup faces 6", 6" of a group of three adjacent pockets 5 are parallel or substantially parallel to one another.

As noted above, the male dies 1, 2 possess a width such that they punch out a bit more than half of the pocket boundary. In accordance with the present invention, the dies each possess an active punching width in the circumferential direction of the roller cage that is less than the width of the pockets. The active punching width of the dies can be between 0.5 and 0.7 times the width of the pockets. Also, the punching operation is carried out so that the punching direction, referred to with reference to the cage, extends radially outwardly from inside the roller cage.

The apparatus and method according to the present invention, and the roller cage produced thereby, provide a variety of advantages. In one respect, the spacing of the two male dies 1, 2 is adapted with respect to the roller cage diameter, i.e., the spacing between the dies 1, 2 is equal to at least about 0.4 times the roller cage diameter and is preferably about 0.6 times the roller cage diameter.

Also, one or more pockets that are not machined in a particular indexing position of the roller cage are always located between the male dies. The circumferentially outer cutting edges of the dies punch out a runup face that is already adapted to the roller and extends obliquely and at a tangent to the jacket face of the roller. As a result, the roller cage is located farther away from the roller axis on the jacket face and is therefore more easily guided and has less tendency to seize on the roller. Also, the inclination of the runup face makes the runup face relatively broad, thus facilitating lubrication. Also, the runup face produced in this way requires no further punching or cutting operations.

Additionally, a bit more than half of the pocket width in the circumferential direction is punched out which is particularly important from the standpoint of the supplementary punching operation in which the remaining pocket material is punched out with the other male die after suitable indexing. Because approximately one-half the pocket width is still left in place after the initial punching operation, conditions that exist when the first half is punched out also exists when the remaining portion is punched out. In other words, the web does not drift in the circumferential direction by the punching forces. Instead, the roller cage is automatically held in position because of the large punching area. Further, the male die is not seized in the pocket by virtue of the resiliency of the material. The result is greater dimensional accuracy of the pocket and a high surface quality of the runup surfaces.

The principles, a preferred embodiment and the mode of operation of the present invention have been described in the foregoing specification. However, the invention which is intended to be protected is not to be construed as limited to the particular embodiments described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention be embraced thereby.

What is claimed is:

1. An apparatus for punching out pockets in a roller cage having a diameter, comprising two spaced apart male dies for removing portions of a pocket boundary to produce pockets spaced apart by a spacing in the roller cage, and a device for incrementally rotating the roller cage in a circumferential direction in increments substantially equal to the spacing between adjacent pockets in the roller cage, each die having an outer edge for producing a runup face in the roller cage, the spacing between the outer edges of the dies being equal to at least 0.4 times the cage diameter, said dies each possessing an active punching width in a circumferential direction of the roller cage that is less than the width of the pockets.

2. The apparatus according to claim 1, wherein the active punching width of each die is from 0.5 to 0.7 times the width of the pockets.

3. The apparatus according to claim 2, wherein the dies are movable radially from inside the cage.

4. The apparatus according to claim 1, wherein the dies are movable radially from inside the cage.

5. The apparatus according to claim 1, wherein the dies are spaced apart by a distance greater than the spacing between adjacent pockets.

* * * * *